United States Patent
Cheng et al.

(10) Patent No.: US 8,330,818 B2
(45) Date of Patent: Dec. 11, 2012

(54) IMAGE-BASED VEHICLE MANEUVERING ASSISTANT METHOD AND SYSTEM

(75) Inventors: Kuo-Hsiang Cheng, Taipei County (TW); Yen-Shu Chang, Taoyuan County (TW); Wei-Min Lee, Kaohsiung (TW); Shan-Chuan Jeng, Pingtung County (TW); Long-Tai Chen, Miaoli County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 1003 days.

(21) Appl. No.: 12/353,435

(22) Filed: Jan. 14, 2009

(65) Prior Publication Data

US 2010/0085427 A1    Apr. 8, 2010

(30) Foreign Application Priority Data

Oct. 7, 2008 (TW) ................. 97138499 A

(51) Int. Cl.
*H04N 5/30* (2006.01)
(52) U.S. Cl. ............. 348/148; 348/144; 348/154
(58) Field of Classification Search ........ 348/135, 348/141, 143, 144, 148, 154, 155, 158, 161
See application file for complete search history.

(56) References Cited

U.S. PATENT DOCUMENTS

| | | |
|---|---|---|
| 7,006,127 B2 | 2/2006 | Mizusawa et al. |
| 2005/0163343 A1 | 7/2005 | Kakinami et al. |
| 2007/0299596 A1* | 12/2007 | Moritz et al. ............ 701/117 |
| 2008/0170122 A1* | 7/2008 | Hongo et al. ............ 348/148 |

FOREIGN PATENT DOCUMENTS

| | | |
|---|---|---|
| CN | 2600787 Y | 1/2004 |
| JP | 2004198211 A | 7/2004 |
| JP | 2007206785 A | 8/2007 |
| TW | 200736090 | 10/2007 |
| TW | 200823430 | 6/2008 |
| TW | 200823772 | 6/2008 |

OTHER PUBLICATIONS

State Intellectual Property Office of the People's Republic of China, "Office Action", May 11, 2011, China.
Taiwan Intellectual Property Office, "Office Action", May 18, 2010, Taiwan.
Korean Intellectual Property Office, "Office Action", Mar. 8, 2011, Korea.

* cited by examiner

*Primary Examiner* — Barbara Burgess
(74) *Attorney, Agent, or Firm* — Morris Manning & Martin LLP; Tim Tingkang Xia, Esq.

(57) ABSTRACT

An image-based vehicle maneuvering assistant method and system are provided in the present invention, in which images captured by a single image sensing device is processed to determine the changes with respect time by a controller having capability of image processing and identification and distance estimation in image space for providing a complete assisting image-information while the carrier is maneuvering. By means of the presented method of the presented invention, the system is capable of generating track of the carrier, view point transformation, and identifying the characteristic object in the image so as to performing the distance estimation. The present invention may be utilized and applied in different kinds of carrier type to solve the problem of guiding of carrier maneuvering, and assist the carrier lane changing, parking assistance and blind spot detection.

12 Claims, 11 Drawing Sheets

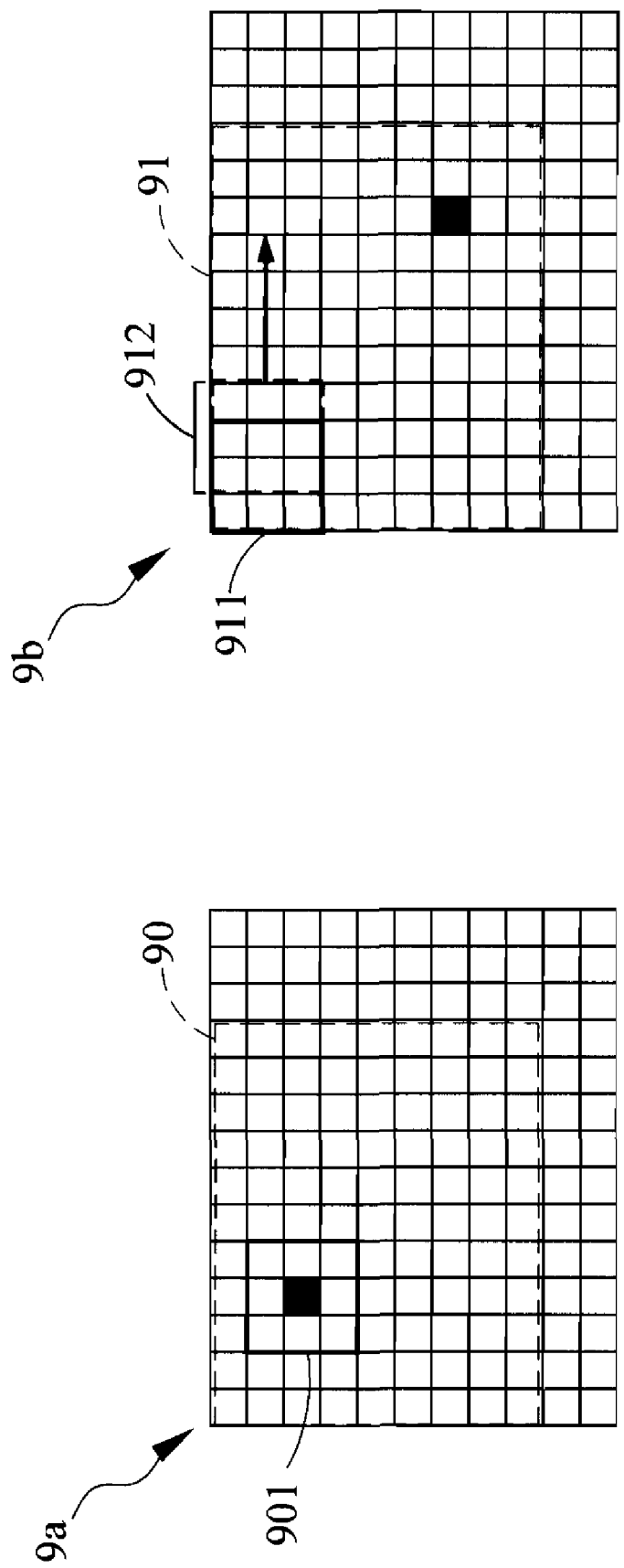

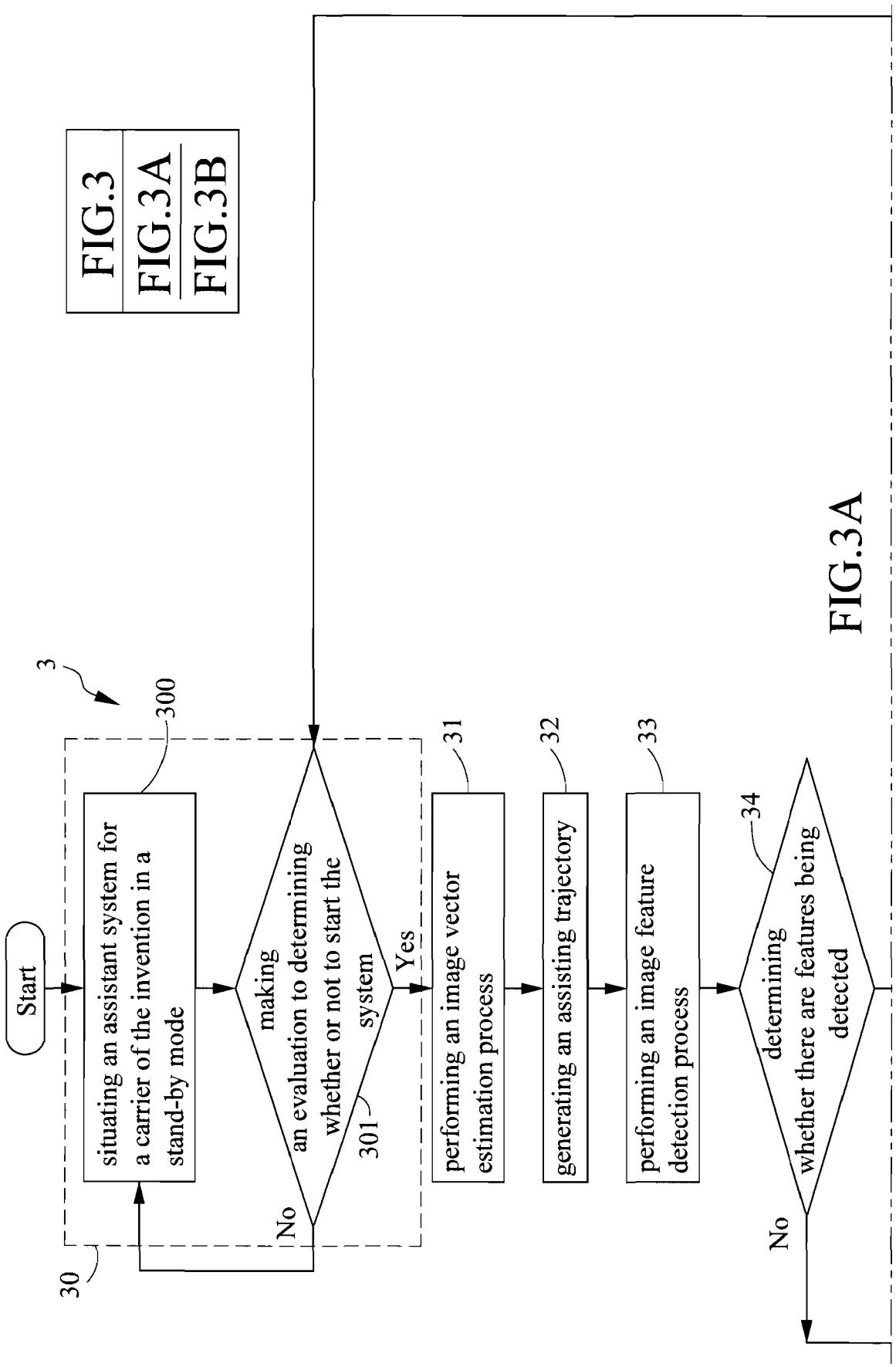

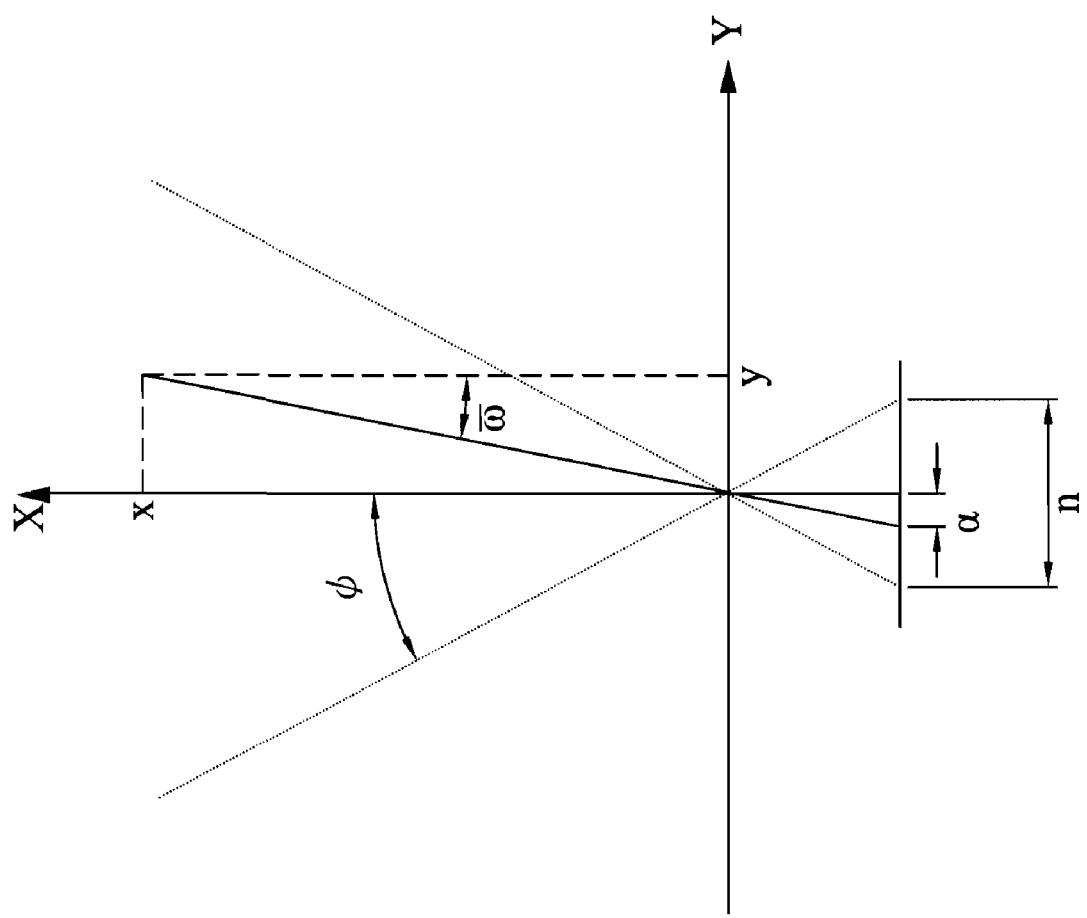

IMAGE-BASED VEHICLE MANEUVERING ASSISTANT METHOD AND SYSTEM

CROSS-REFERENCE TO RELATED APPLICATIONS

This non-provisional application claims priority under 35 U.S.C. §119(a) on Patent Application No. 097138499 filed in Taiwan on Oct. 7, 2008, the entire contents of which are hereby incorporated by reference.

FIELD OF THE INVENTION

The present invention relates to a method for assisting the maneuvering of a vehicle, and more particularly, to an image-based vehicle maneuvering assistant method and system capable of applying an image identification technique upon images relating to a moving vehicle with regard to the moving track of the vehicle and the identification of obstacles and traffic signs so as to be used as basis for generating a guidance information to assist the maneuvering of the vehicle.

BACKGROUND OF THE INVENTION

Generally, most drivers would be very much appreciated if he or she can have the ability to aware of each and every obstacle in his/her moving track of vehicle for improving driving safety, which is especially true when the driver is maneuvering a vehicle in his/her visual blind spots for parking or passing through a narrow road section. Nowadays, thanks to the rapid development in electronic technology, many automobile manufacturers had answered such desire by starting to install electric sensors in their products. There are two types of sensors that are most commonly used, one of which is referred as the distance sensor such as ultrasonic sensors, infrared sensors, millimeter wave sensors and radar sensor; and the other is referred as the image sensor such as CCD and CMOS. The distance sensor is usually being applied as a unidirectional obstacle detector for issuing an alarm for alerting the condition that there is an obstacle blocking the moving track of the vehicle on which it is installed, and is mostly seen in adaptive cruise control system, car reversing radar aid system, and so on. Moreover, the image sensor is used as a wide-range visual assistant in lane/vehicle identification system, rear view camera system, or blind spot detection system, and so on. It is noted that if there is a vehicle maneuvering system capable of proving a driver with sufficient information relating to the dynamic moving trajectory of the vehicle and the distances measured between the vehicle and the obstacles in its moving track, the driver can drive safely under the guidance of the vehicle maneuvering system with the minimum chance of collision.

There are already many driving assistant methods available. One of which is a parking assistant apparatus disclosed in China, Pat. No. CN179378. The aforesaid parking assistant apparatus is advantageous in that: it can identify a parking space rapidly and with high precision, and thus it can help alleviate the driver's sufferings relating to parking. The aforesaid parking assistant apparatus first use a rear view camera to capture an image of a parking space where the drive is intended to park; and then the system will identify a parking zone on the captured image to be used for planning a parking trajectory to assist the driver. In detail, the aforesaid parking assistant apparatus includes: a detection unit, capable of detecting information relating to the moving of the vehicle; a storage unit, for storing information relating to the detected moving history of the vehicle; a parking space evaluation unit, capable of performing a search according to the information relating to the detected moving history of the vehicle stored in the storage unit for obtaining pseudo-target parking spaces; and a parking space identification unit, for identifying a parking zone form the pseudo-target parking spaces.

Another such prior-art method is a driver aiding system disclosed in U.S. Pat. No. 7,006,127, which includes: a displaying section, arranged at a position that can be looked at from a driver's seat of a vehicle; an image picking-up section, for picking up an image of a rear portion of the vehicle containing at least a part of a hitch that is provided to the rear portion of the vehicle; and an image processing section for causing the displaying section to display a synthesized image that is obtained by image-processing an image picked up by the image picking-up section. A hitch image of own vehicle in addition to an image of a trailed vehicle and an image of a destination coupler are displayed on a screen of the displaying section. As a result, the relative positional relationship between the hitch and the destination coupler can be checked on the screen and thus the hitch coupling operation can be facilitated.

SUMMARY OF THE INVENTION

The object of the present invention is to provide an image-based vehicle maneuvering assistant method, capable of performing a recognition process upon a series of images relating to a moving carrier so as to obtain a moving trajectory of the carrier; and during the proceeding of the recognition process, distances between the carrier and the feature identified in the images can be obtained to be used for guiding the carrier to move. The method of the invention is applicable to various carriers, especially for large-sized transportation equipments whose driving safety is always in question since the large-sized transportation equipments usually-possess many blind spot areas that are not visible to the driver. Thus, by the assistant provided by the image-based vehicle maneuvering assistant method of the invention, not only the driving safety of the carrier using the present method can be enhanced, but also the safety of other carriers and pedestrians sharing the same road are ensured.

It is another object of the invention to provide an image-based vehicle maneuvering assistant system, capable of using overlook images and images captured from common viewing angle by a single camera to be used for guiding the maneuvering of a carrier, while the guiding includes: providing a complete parking trajectory for directing the carrier to park into a parking space detected in the captured images; and identifying obstacles and traffic signs in the moving track of the carrier and the same time measuring the distance therebetween so as to be used for determining whether or not a collision alert should be issued.

Moreover, another object of the invention is to provide an image-based vehicle maneuvering assistant system, capable of guiding the maneuvering of a carrier without the assistants from at least a camera and at least a steering angle sensor as those conventional driving guidance systems did, that is, the system of the invention is capable of guiding the maneuvering of a carrier by the use of a single camera and an calculation algorithm embedded therein, thereby, its installation can be as easy as those common car surveillance system since there is no additional automobile sensors required to be connected, and consequently the system of the invention is low in cost, easy to install and flexible in usage.

In an exemplary embodiment, the present invention provides an image-based vehicle maneuvering assistant method, comprising the steps of: obtaining a first image relating to the surrounding environment of a carrier at a first time point; selecting a datum area from the first image; obtaining a second image relating to the surrounding environment of the carrier at a second time point; performing a search in the second image for locating a comparison area that corresponds to the datum area in the first image so as to acquire a motion vector measure between the comparison area and the datum area; and determining a moving trajectory of the carrier according to the motion vector.

In another exemplary embodiment, the present invention provides an image-based vehicle maneuvering assistant method, comprising the steps of: (a) obtaining a series of images relating to the surrounding environment of a carrier at different time points while calculating a motion vector of a specific area selected from those images basing on the variations of that specific area in those images with respect to time for determining a moving status for the carrier; (b) determining a moving trajectory for the carrier according to the moving status; (c) detecting at least a feature in the series of image; and (d) identifying the at least one feature so as to select and thus perform an assistant procedure in correspondence to the type of the at least one feature that is identified.

Yet, in another exemplary embodiment, the present invention provides an image-based vehicle maneuvering assistant system, comprising: an image sensing device, for capturing images relating to the surrounding environment of a carrier; a controller, connected to the image sensing device and capable of using the images from the image sensing device to calculate a motion vector of a specific area selected from those images basing on the variations of that specific area in those images with respect to time for determining a moving status for the carrier and then determining a moving trajectory for the carrier according to the moving status; and a display unit, connected to the controller for displaying the images from the image sensing device and the moving trajectory of the carrier from the controller; wherein, the controller is designed to convert the images captured by the image sensing device into overlook images as soon as a distance between the carrier and a feature detected in the images is smaller than a predetermined distance and thus provide an overlook image signal to the display unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 2A is a schematic view of a first image obtained in FIG. 1.

FIG. 2B is a schematic view of a second image obtained in FIG. 1.

FIG. 5A to FIG. 5C are schematic diagrams relating to how an image captured by the image sensing device of the invention is converted into an overlook image.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
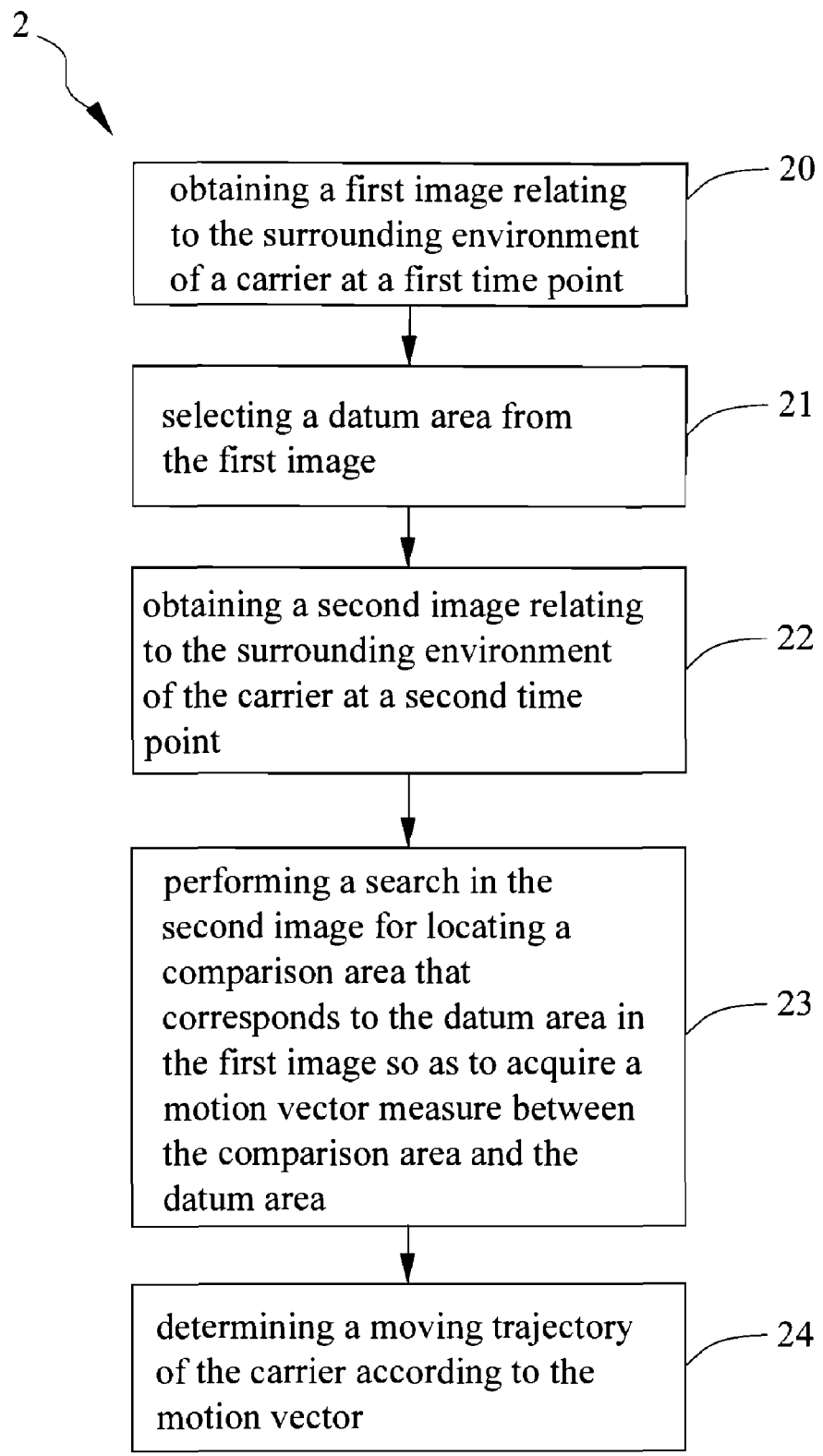
FIG. 1 is a flow chart depicting steps of an image-based vehicle maneuvering assistant method according to an embodiment of the invention.

Please refer to FIG. 1, which is a flow chart depicting steps of an image-based vehicle maneuvering assistant method according to an embodiment of the invention. In this embodiment, the method of the invention will detect specific features in a series of images captured at difference time points while identifying the moving characteristic of such specific features so as to obtain a moving direction relating to such specific feature to be used for determining a moving status of a carrier. Then, according to the moving status of the carrier, such as the carrier is turning, a moving trajectory of the carrier can be estimated and thus displayed to the driver of the carrier as reference. The flow of FIG. 1 starts from step 20. At step 20, a first image relating to the surrounding environment of a carrier is obtained at a first time point; and then the flow proceeds to step 21. In this embodiment, the first image is an image capturing the rear surrounding environment of the carrier, but is not limited thereby. The first image can be captured by the use of those conventional imaging device, such as CCD or CMOS, as those imaging device can be mounted easily on the rear of the carrier for capturing rear-view images of the carrier. It is noted that the carrier can be a wheeled vehicle, such as a car, a truck, a container, etc., or an aircraft or even a boat, but is not limited thereby.

At step 21, a datum area is selected from the first image; and then the flow proceeds to step 22. As the first image 9a shown in FIG. 2A, there is a detection area 90 first being designated in the first image 9a and then a specific region in the detection area 90 is selected to be a datum area 901. It is noted that the size and range of the detection area 90 is determined according to actual requirement without special restriction which is also true to the datum area. At step 22, a second image relating to the surrounding environment of the carrier is obtained at a second time point, as shown in FIG. 2B; and then the flow proceeds to step 23. It is noted that when the second image of the carrier captured at the second time point is taken when the carrier is moving, such as backing, there will be differences between the first and the second images which can be detected by image processing and thus to be used for identifying the movement of the carrier.

At step 23, a search is performed in the second image 9b for locating a comparison area that corresponds to the datum area 901 in the first image 9a so as to acquire a motion vector measure between the comparison area and the datum area 901. Similar to the first image 9a shown in FIG. 2A, there is a detection area 91 first being designated in the second image 9b and then a detection window 911 of the same size as the datum area 901 of the first image 9a is formed in the detection area 91 in a manner that it is moved from left to right and top to bottom therein and is compared with the datum area 901 each time it is move to a different location until a comparison area corresponding to the datum area 901 is identified and located in the second image 9b. As shown in FIG. 2B, the first comparison is performed when the detection window 911 is located at the top-left corner of the second image 9b. In this embodiment, the detection window 911 is a 3-pixel by 3-pixels block, but it is not limited thereby. It is noted that the size of the detection window 911 is determined basing on the size of the datum area 901 selected in the first image 9a so that the size of the detection window 911 is changed when the size of the datum area 901 is changed. In FIG. 2B, the feature characteristic in the area covered by the detection window 911 can be obtained by the following formula:

$$SAD_i(p,q) = \Sigma_{X,Y \in A_i} |I(t-1,X,Y) - I(t,X+p,Y+q)| \quad (1)$$

$$imv_i = \min_{p,q} SAD_i(p,q) \quad (2)$$

Wherein, $I(t-1,X,Y)$ represents a characteristic value of a location $(X,Y)$ in the image space defined in the first image 9a as it is taken at the first time point $(t-1)$, i.e. it is the characteristic value relating to the center of the datum area 901. In this embodiment, the characteristic value is gray level value. Moreover, $I(t,X,Y)$ represents the gray level value of a location $(X,Y)$ in the image space defined in the second image 9b as it is taken at the second time point $(t)$, i.e. it is the gray level value relating to the center of the detection window 911. $A_i$ is an image area defined in the second image by the detection window 911 as it is moved to its $i^{th}$ location. $SAD_i(p,q)$ is the sum of absolute difference (SAD) between the $i^{th}$ detection window 911 and the datum area 901 as the displacement between the center of $i^{th}$ detection window 911 and that of the datum area 901 in the space image is $(p, q)$. The $\min_{p,q} SAD_i(p,q)$ represents the minimum of all the obtained SADs during the movement of the detection window 911; and $imv_i$ represents the local motion vector (LMV) of the $i^{th}$ detection window 911 which causes the minimum SAD.

Figure 2C:
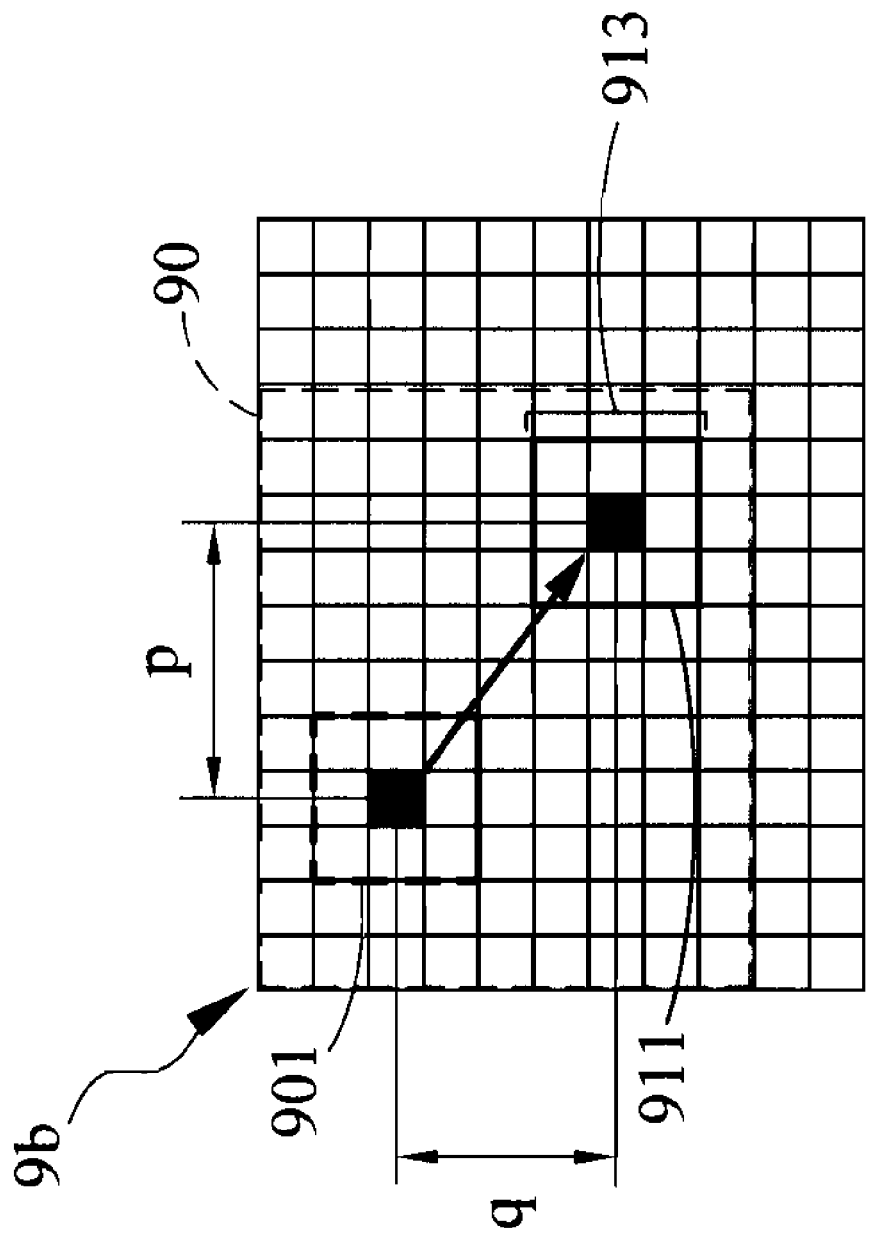
FIG. 2C is a schematic diagram showing how the motion vector is obtained in the present invention.

As shown in FIG. 2B, a SAD value is first being obtained by comparing the area covering under the detection window 911 at its first location; and then, the detection window 911 is move to its right by one pixel for covering the area 912, another SAD value can be obtained using the formula (1) by the same comparison. As the detection window 911 is move from left to right and top to bottom in the second image 9b, there will be a plurality of such SAD values to be obtained. Thereafter, by the second formula (2), a minimum SAD is located from the plural SAD values. AS shown in FIG. 2C, if the area 913 is the area with the minimum SAD, it will be designated as the position where the datum area 901 should be in the second image 9b at the second time point (t) when the second image 9b is captured. Thus, as shown in FIG. 2C, the distance (p, q) between the datum area 901 at the first time point and the detection window 911 with the minimum SAD can be used as the motion vector happened form the first time point (t−1) and the second time point (t).

With continuing reference to FIG. 1, the step 24 is proceeded after the motion vector is obtained. At step 24, a moving trajectory of the carrier is determined according to the motion vector. During the performing of the step 24, the motion vector obtained according to the variation of the two images captured at two different time points is used for establishing the moving status of the carrier. For instance, when the carrier is backing with a specific steering angle, its moving trajectory can be estimated in advance since its backing distance per unit time and the steering angle are known. Thus, for reconstructing moving trajectory, a trajectory database relating a moving trajectory to its corresponding moving status of a carrier can be built in advance, in which the relationship between moving trajectory of a carrier with the carrier's steering angle, speed and parameters of an image sensing device mounted in the carrier for capturing image including height, viewing angle, overlook angle are established. Accordingly, by the motion vector obtained in step 23, the moving status of the carrier relating to its steering angle can be known and is used married with the parameters of an image sensing device mounted in the carrier for capturing image as basis to search in the trajectory database so as to locate a moving trajectory corresponding thereto which is then being displayed to the driver of the carrier as reference. Conventionally, only images captured by the image sensing device mounted on the carrier are displayed to the driver of the carrier as reference despite that they are changed with the steering of the carrier. Nevertheless, there is no moving trajectory with driving assisting information being displayed to the driver so that the driver of the carrier can not be aware of any danger directly from those images form the image sensing device. However, by the moving trajectory obtained from the step 24 that are displayed to the driver as reference, the driver is able to rapidly and directly recognize whether the carrier is going to collide with an obstacle or drive on a pavement marker.

Figure 3B:
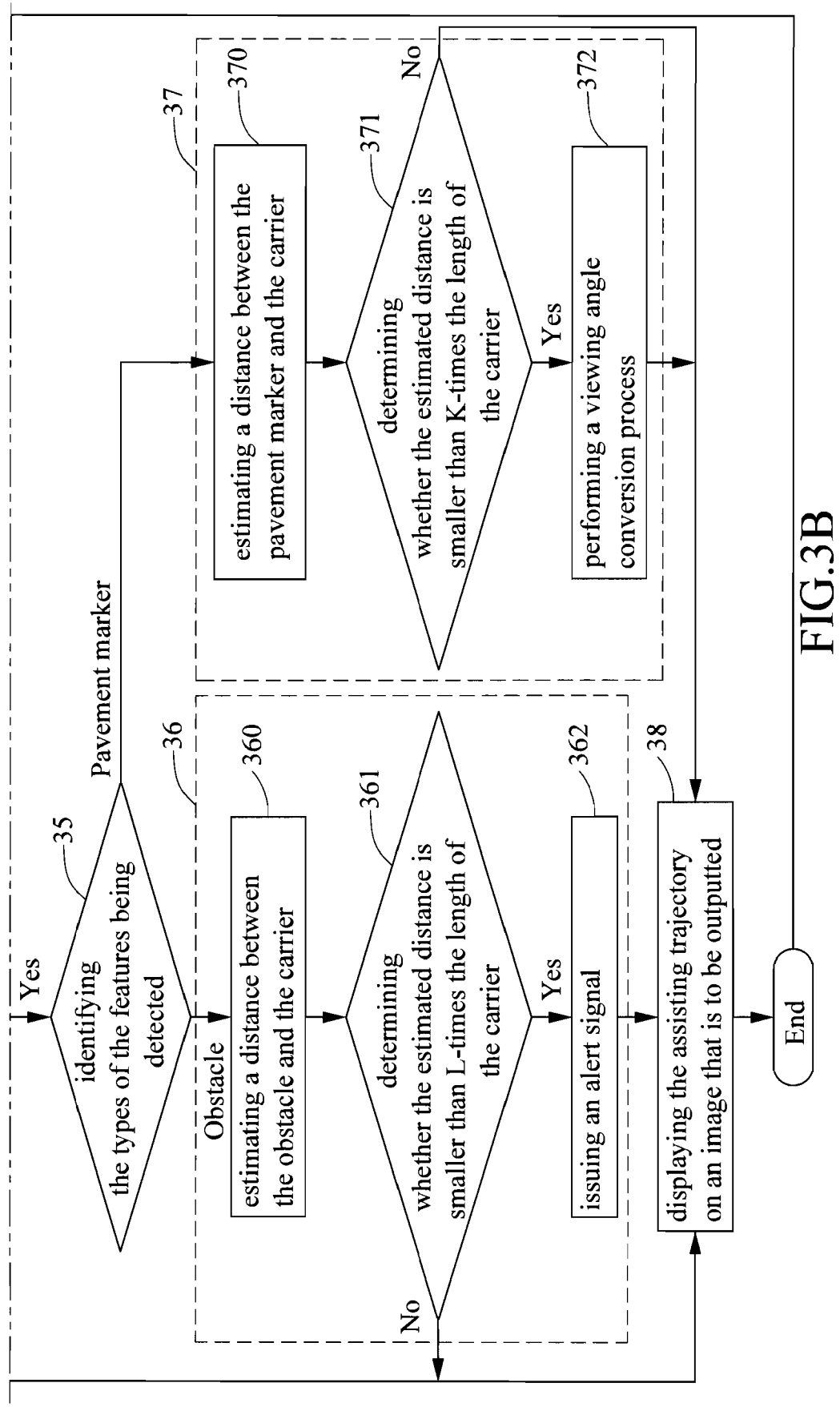
FIG. 3 is a flow chart depicting steps of an image-based vehicle maneuvering assistant method according to another embodiment of the invention.

Please refer to FIG. 3, which is a flow chart depicting steps of an image-based vehicle maneuvering assistant method according to another embodiment of the invention. In this embodiment, another image-based vehicle maneuvering assistant method is provided which integrates all the operations in the previous embodiment as well as means of image feature identification, distance estimation, viewing angle conversion and alarm issuing. The image-based vehicle maneuvering assistant method 3 starts from the step 30. In step 30, an assistant system for a carrier of the invention is situated in a stand-by mode, as in the sub-step 300, until an evaluation performed in the sub-step 301 determines to starts the system. In step 301, the system can be started according to the gear position of the carrier or by the pressing of a start button, but is not limited thereby. In this embodiment, the system is started as soon as the carrier is in reverse gear.

After the system is started, the flow of the method proceeds to step 31. At step 31, an image vector estimation process is performed to calculate a motion vector of a specific area from images a series of images relating to the surrounding environment of a carrier at different time points for determining a moving status for the carrier; and then the flow proceeds to step 32. At step 32, an assisting trajectory is generated according to the moving status; and then the flow proceeds to step 33. It is noted that the determination of the moving status as well as that of the moving trajectory, performed in step 31 and step 32, are similar to those described in the embodiment of FIG. 1, and thus are not described further herein. At step 33, an image feature detection process is performed for detecting at least one feature; and then the flow proceeds to step 34. In the embodiment, the feature can be an obstacle or a pavement marker, but is not limited thereby, while the technique for feature detection are known to those skilled in the art and thus will not be described further herein. At step 34, an evaluation is perform to determine whether there is at least one feature being detected; if so, the flow proceeds to step 35; otherwise, the flow proceeds to step 38. At step 35, the type of the at least one feature being detected are identified so as to select and thus perform an assistant procedure in correspondence to the type of the at least one feature that is identified.

Figure 4A:
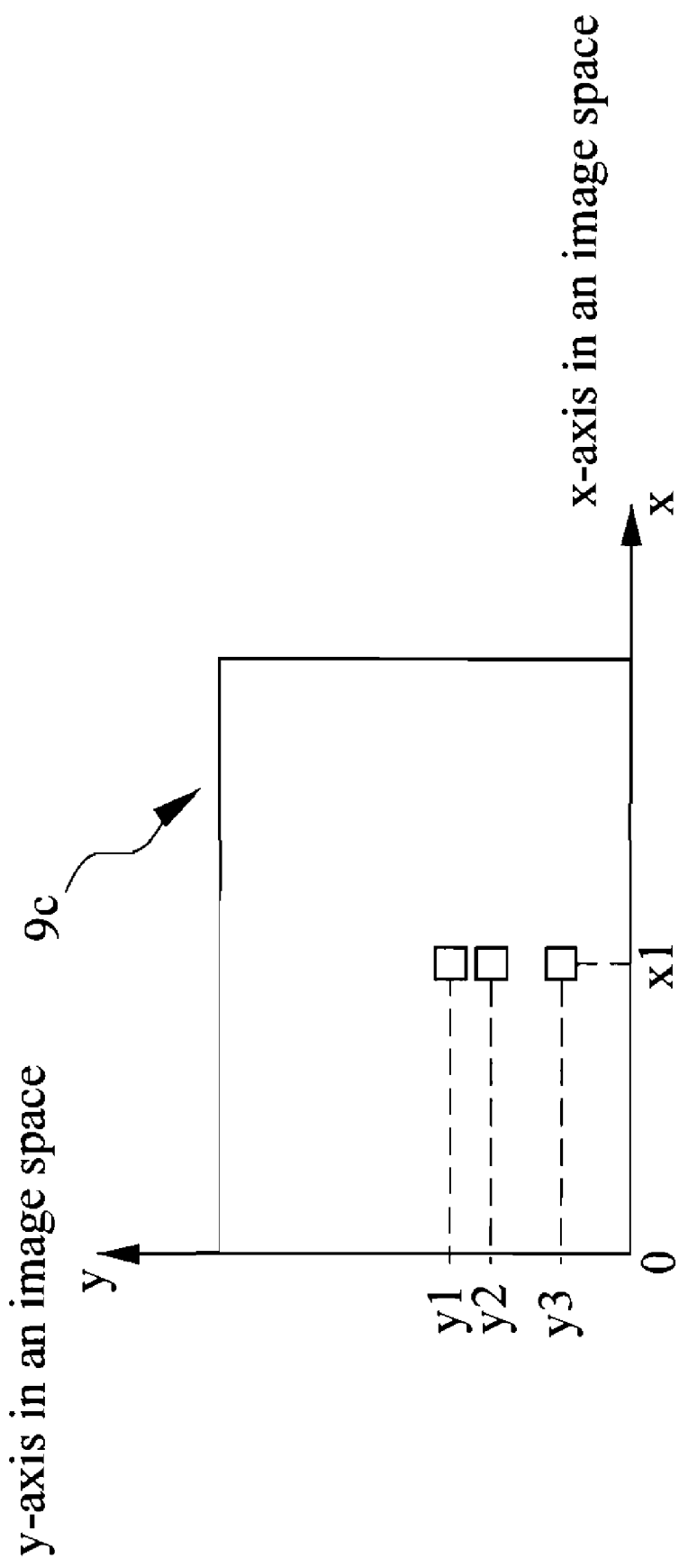
FIG. 4A and FIG. 4B are schematic diagrams showing the distance measured in an image space and the real space according to the present invention.

In this embodiment, there are two assistant procedures, which are obstacle maneuvering procedure 36 and pavement marker maneuvering procedure 37. Thereby, when the feature detected is identified to be an obstacle in the step 35, the flow will proceed to perform the obstacle maneuvering procedure 36; on the other hand, when the feature detected is identified to be a pavement marker, the flow will proceed to perform the pavement marker maneuvering procedure 37. If the obstacle maneuvering procedure 36 is selected, the flow will proceed to step 360. At step 360, a distance between the obstacle and the carrier is estimated by a means including the steps of: building in advance a formula for transforming coordinates used for defining locations of the at least one feature detected in the images into distances in real world; and using the coordinates of the identified feature to obtain the distance to the identified feature; and then the flow proceeds to step 361. Please refer to FIG. 4A and FIG. 4B, which are schematic diagrams showing the distance measured in an image space and the real space according to the present invention. In FIG. 4A, the image 9c is an image captured by the image sensing device mounted on a carrier relating to the surrounding environment of the carrier. Since the position and height relating to where the image sensing device is mounted on the carrier, as well as its viewing angle, angle of depression and angle of elevation are known, the relationship between the real world and the image space of the image sensing device can be established in advance. It is noted that the so-called image space is an Cartesian coordinate system for defining the positions of each pixel in the image 9c captured by the image sensing device; while the real world refers to the environment where the carrier is in, As shown in FIG. 4A, the coordinates of each pixel in the image 9c that is measurable can be mapped with the coordinates of a location in real world that is corresponding thereto. Although one pixel is used in this embodiment as resolution unit, it is possible to include more than one pixel as a resolution unit to be used for establishing a lookup table depicting the relationship between the real world and the image space.

Figure 4B:
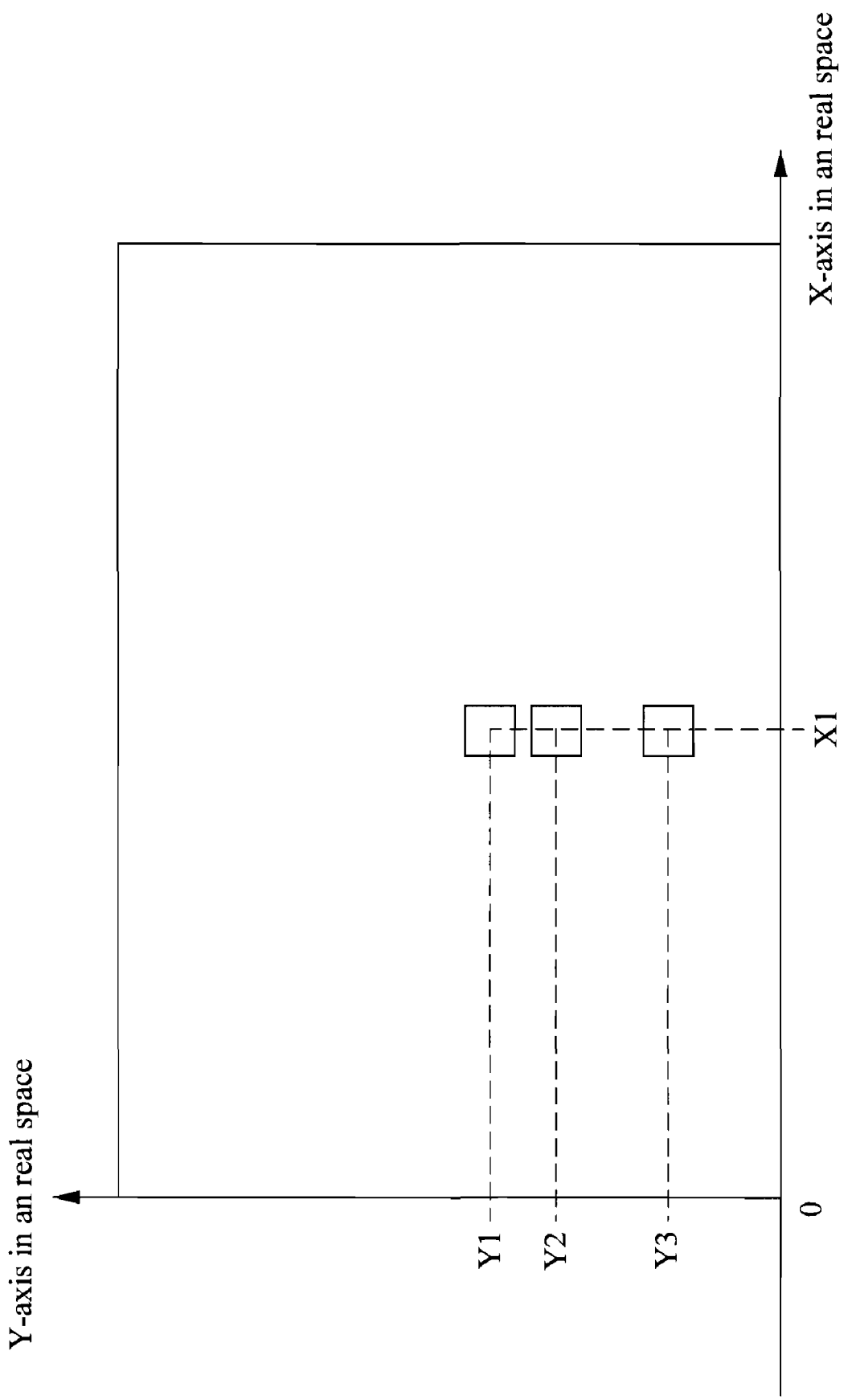

As shown in FIG. 4A, the pixels (x1, y1), (x2, y2) and (x3, y3) in the image space of the image 9c are mapped to the locations (X1, Y1), (X2, Y2), and (X3, Y3) in respective, by that a formula for transforming coordinates in the image space of FIG. 4A into distances in real world of FIG. 4B can be calculated and thus obtained. With continuing reference to FIG. 3, after the distance to the detected obstacle is obtained by the use of pre-established relationship between image space and real world while the position of the obstacle in the real world is located, the flow will proceeds to step 361. At step 361, an evaluation is performed for determining whether the estimated distance is smaller than a specific distance, such as L-times the length of the carrier; if so the flow proceeds to step 362; otherwise, the flow proceeds to step 38. At step 362, an alert signal is issued; and then the flow proceeds to step 38. At step 38, the moving trajectory generated by the step 32 is displayed.

Figure 5A:
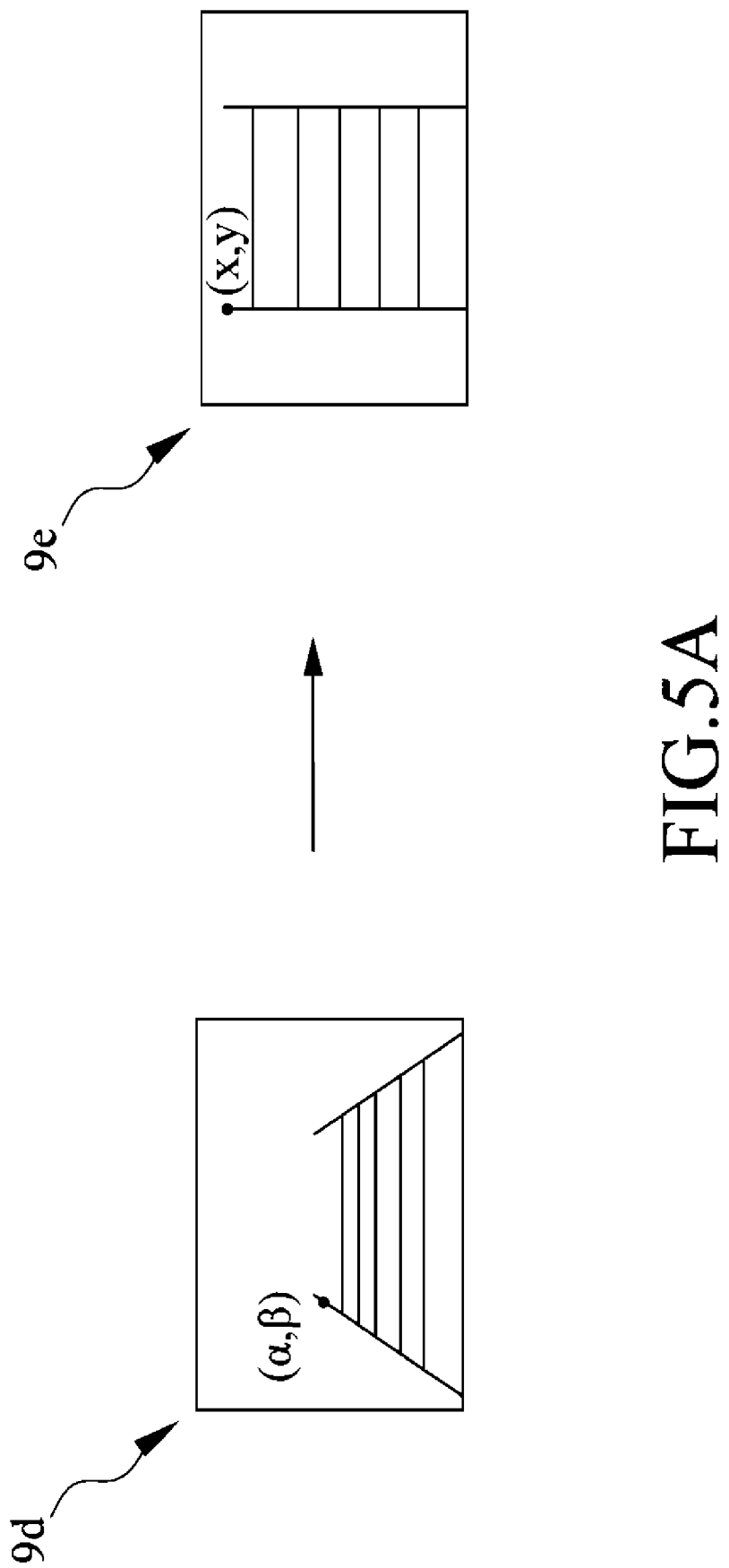

On the other hand, if the obstacle maneuvering procedure 36 is selected as the detected feature is identified to be a pavement marker, the flow will proceed to step 370. At step 370, a distance between the pavement marker and the carrier is estimated in a manner similar to the step 361 and thus will not be described further herein; and then the flow proceeds to step 371. At step 371, an evaluation is performed for determining whether the estimated distance is smaller a specific distance; if so, the flow proceeds to step 372; otherwise, the flow proceeds to step 38. In this embodiment, the specific distance is defined as K-times the length of the carrier, but is not limited thereby. At step 372, a viewing angle conversion process is performed for converting images of common viewing angle into overlook images for facilitating the driver of the carrier to recognize the distance between the pavement marker and the carrier from the image that is displayed. As shown in FIG. 5A, the image conversion is performed by a means of image geometrical transformation that is capable of converting an image 9d captured by level viewing angle into an overlook image 9e by the cooperation of an inverse perspective mapping algorithm and an image distortion calibration technique.

Figure 5B:
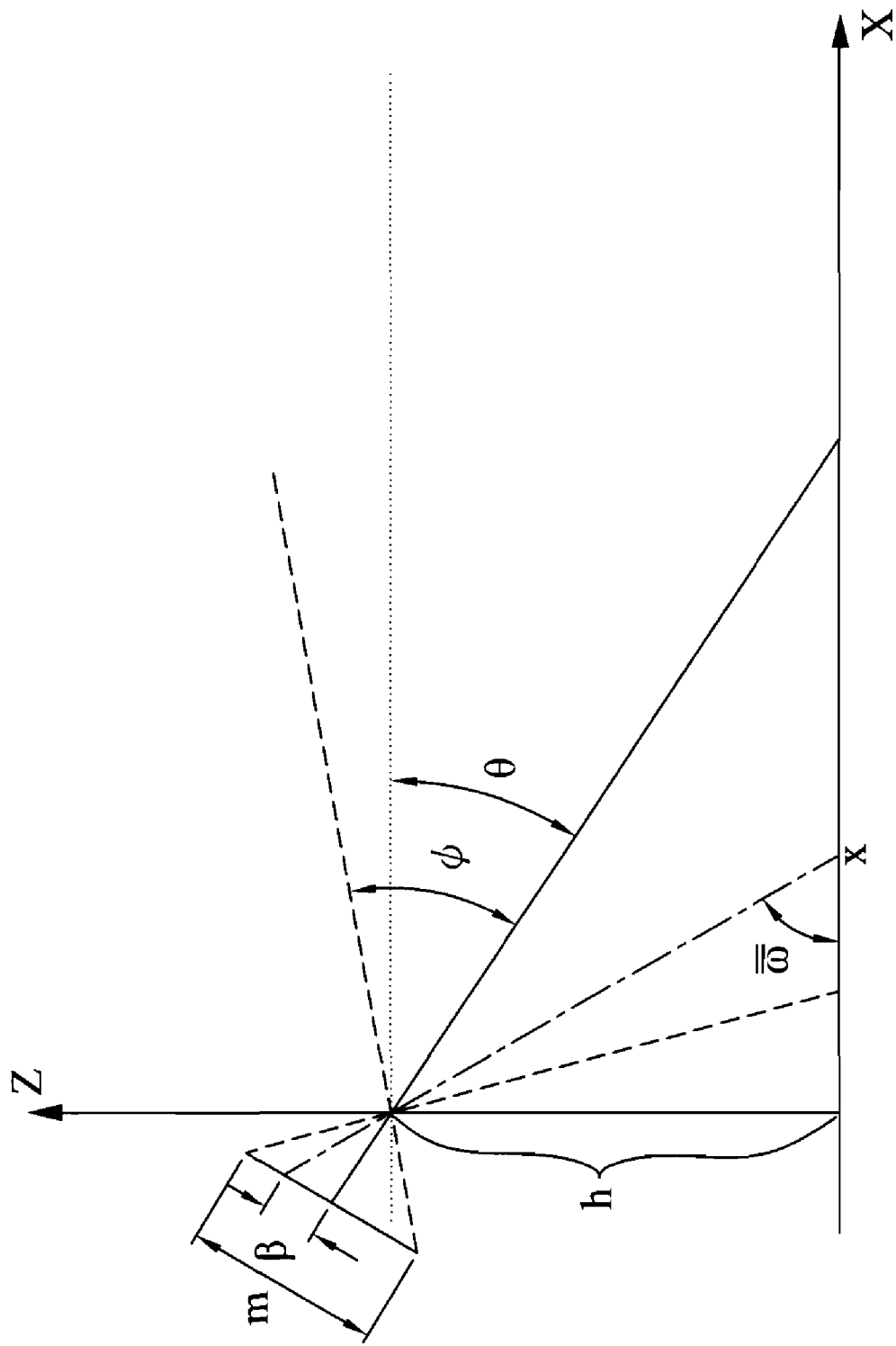

The aforesaid image conversion is based on an assumption that the carrier is moving on a flat road, so that the distance error resulting from the inverse perspective mapping can be ignored. Please refer to FIG. 5B and FIG. 5C, which are schematic diagrams relating to how an image captured by the image sensing device of the invention is converted into an overlook image. The image conversion is performed under the assumption that the carrier is moving on a plane defined by the equation Z=0 in a real world coordinate system while enabling an included angle of θ to be formed between the optical axis of a camera positioned at (0, 0, h) and the aforesaid plane and another included angle of γ to be formed between the same the X axis of the real world coordinate system. In this embodiment, the angle γ is set to be zero degree, but is not limited thereby. Assuming the camera is configured with a viewing angle of 2ψ and n×m resolution, a point whose coordinate in real world is (x, y, 0) can be converted into a point (α, β) in the image space by the following formula:

$$\alpha(x, y, 0) = \frac{\varpi(x, y, 0) - (\gamma - \phi)}{\frac{2\phi}{n-1}} \quad (3)$$

$$\beta(x, y, 0) = \frac{\varpi(x, y, 0) - (\theta - \phi)}{\frac{2\phi}{m-1}} \quad (4)$$

wherein, $1 < \alpha < n, 1 < \beta < m$;

$$\varpi = \arctan\left(\frac{x}{y}\right);$$

$$\varpi = \arctan\left(\frac{h}{\sqrt{x^2 + y^2}}\right).$$

Thereby, an overlook image corresponding to the original image captured by the camera at viewing angle of 2ψ can be obtained. That is, the pixel (α, β, 0) in the image 9d of FIG. 5A is transformed into the pixel (x, y, 0) in the image 9e.

Figure 6:
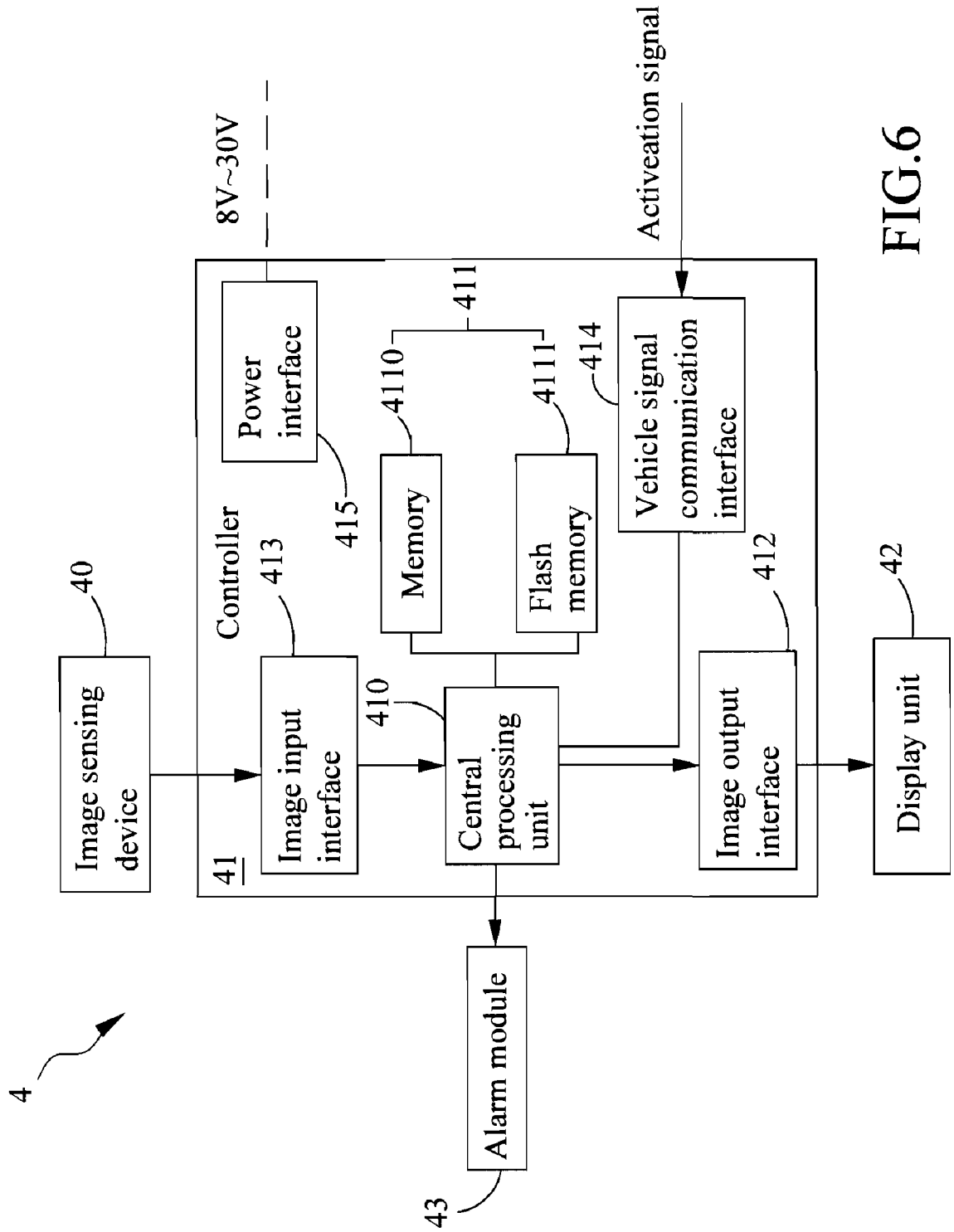
FIG. 6 is a block diagram of an image-based vehicle maneuvering assistant system according to an exemplary embodiment of the invention.

Please refer to FIG. 6, which is a block diagram of an image-based vehicle maneuvering assistant system according to an exemplary embodiment of the invention. In the embodiment shown in FIG. 6, the image-based vehicle maneuvering assistant system 4 comprises: an image sensing device 40, a controller 41 and a display unit 42. The image sensing device 40 is mounted on a carrier for capturing images relating to the surrounding environment of the carrier, which can be a CCD or CMOS, but is not limited thereby. It is noted that the image sensing device 40 can be disposed at any position on the carrier depending only on actual imaging requirement without any other restriction. In this embodiment, the image sensing device 40 is arranged at the rear of the carrier for capturing rear image of the carrier, that it is configured with a level viewing range between 60 degrees to 190 degrees, 15~30 frames/sec imaging frequency, and 15~20 frames/sec output speed. It is noted that the viewing angle as well as the specification of the image sensing device 40 is variable according to the type and the position of the carrier that it is mounted.

The controller 41 is coupled to the image sensing device 40 by an image input interface 411, which is further comprised of: a central processing unit 410, a memory module 411, an image output interface 412, a vehicle signal communication interface 414 and a power interface 415. The central processing unit 410 is capable of using an image signal received from the image input interface 412 to perform operations including image processing, image identification, distance estimation, obstacle detection, image output/input, vehicle signal input, alert signal issuance, and so on, as those exemplified in FIG. 1 and FIG. 3. Wherein, the operation regarding to the issuing of the alert signal will activate an alarm module 43 to issue an alarm for reminding the driver of the carrier that there is an obstacle in the moving path of the carrier and thus preventing the carrier from colliding with the obstacle. The image output interface is coupled to the display unit 42 for enabling the same to display the processing results of the central processing unit 410. For instance, the display unit 42 is able to display the moving trajectory of the carrier, the images captured by the image sensing device 40, the images after viewing angle conversion, etc. The memory module 411 is composed of a memory 4110 and a flash memory 4111. In this embodiment, the memory is a SDRAM of 32 MB, and the flash memory 4111 is a 16 MB flash memory to be used as a temporary memory space buffering the operation of the system. It is noted that the capacity of the memory module 411 is not limited by the aforesaid embodiment.

The vehicle signal communication interface 414 is configured for receiving a signal for activating the system 4 which can be issued from the carrier. Accordingly, the system 4 can be started according to the gear position of the carrier or by the pressing of a start button, but is not limited thereby. For instance, the system is started as soon as the carrier is in reverse gear or other specific gear. Moreover, the controller 41 is connected to a power source through the power interface 415.

Comparing with those conventional driving guidance systems which require more than one kinds of sensors to provide guidance, the system of the invention is capable of guiding the maneuvering of a carrier by the use of a single sensor so that its installation can be as easy as those common car surveillance system since there is no additional automobile sensors required to be connected, and consequently the system of the invention is low in cost, easy to install and flexible in usage. Moreover, as image-based vehicle maneuvering assistant system and method of the invention is capable of generating an overlook image from an image captured from common viewing angle by the use of a conversion and distortion calibration algorithm, the present not only can provide a complete parking trajectory for directing the carrier to park into a parking space detected in the captured images, but also it can identify obstacles and traffic signs in the moving track of the carrier and the same time measure the distance therebetween so as to be used for determining whether or not a collision alert should be issued. Since the system of the invention can be configured easily by software for adapting the same to all kinds of cameras as well as any types of carriers from different manufactures, it is commercially competitive in the after-sales services market of automobile electronics.

In addition, as the method of the invention can be easily programmed for adapting the same to different cameras with regard to their internal parameters and how they are installed, the method of the present invention can be installed and operated through the cameras that are already fitted to the carrier. The method and system of the invention is applicable to various carriers, especially for large-sized transportation equipments, such as a truck, a container, or an aircraft or even a boat, whose driving safety is always in question since not only the large-sized transportation equipments usually possess many blind spot areas that are not visible to the driver, but also their backing trajectory are not easy to controlled. Thus, by installing more than one set of the image-based vehicle maneuvering assistant system of the invention on such large-sized transportation equipments, not only the driving safety of the large-sized transportation equipments using the present system/method can be enhanced, but also the safety of other carriers and pedestrians sharing the same road are ensured.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-based vehicle maneuvering assistant method, comprising the steps of:
   obtaining a first image relating to a surrounding environment of a carrier at a first time point, by an image sensing device;
   selecting a datum area from the first image;
   obtaining a second image relating to the surrounding environment of the carrier at a second time point, by the image sensing device;
   performing a search in the second image for locating a comparison area in the second image that corresponds to the datum area in the first image so as to acquire a motion vector measure between the comparison area and the datum area, by a controller; and
   determining a moving trajectory of the carrier according to the motion vector, by the controller,
   wherein the search in the second image for locating the comparison area that corresponds to the datum area comprises the steps of:
   calculating a first characteristic value relating to the datum area; and
   comparing every area in the second image with the datum area with regard to the first characteristic value to search and select an area whose sum of absolute differences (SAD) is the smallest to be used as the comparison area;
   wherein the searching of the area whose SAD is the smallest to be used as the comparison area comprises the steps of:
   (a) designating an area in the second image to be a detection area;
   (b) calculating the SAD between a second characteristic value of the detection area with the first characteristic value;
   (c) designating another area in the second image to be a detection area;
   (d) repeating the step (b) to step (c) so as to obtain a plurality of SADs accordingly; and
   (e) selecting the minimum from the plural SADs; and
   wherein the calculating of the SAD is proceeded by the following formula:

$$SAD_i(p,q) = \Sigma_{X,Y \in A_i} |I(t-1,X,Y) - I(t,X+p,Y+q)|,$$

while the minimum of the plural SADs is selected according to the following formula:

$$\min_{p,q} SAD_i(p,q).$$

2. The method of claim 1, wherein the first characteristic value is a value of gray level.

3. The method of claim 1, wherein the determining of the moving trajectory of the carrier further comprises the steps of:

determining a moving direction of the carrier according to the motion vector; and using the moving direction to search in a pre-established trajectory database for locating a moving trajectory as the moving trajectory of the carrier.

4. An image-based vehicle maneuvering assistant method, comprising the steps of:
  (a) obtaining a series of images relating to a surrounding environment of a carrier at different time points, by an image sensing device, while calculating a motion vector of a specific area selected from those images basing on the variations of that specific area in those images with respect to time for determining a moving status for the carrier, by a controller;
  (b) determining a moving trajectory for the carrier according to the moving status, by the controller;
  (c) detecting at least a feature in the series of image, by the controller; and
  (d) identifying the at least one feature so as to select and thus perform an assistant procedure in correspondence to the type of the at least one feature that is identified, by the controller,
  wherein the step (d) comprises the steps of:
  estimating a distance to the identified feature if the identified feature is a pavement marker; and
  performing a viewing angle switching process if the distance is smaller than a specific distance;
  wherein the performing of the viewing angle switching process is to convert the images captured from common viewing angle into overlook images; and
  wherein the viewing angle switching process is performed for converting a coordinate (x,y,0) is real world into another coordinate ($\alpha,\beta$) in the image space by the following formula:

$$\alpha(x, y, 0) = \frac{\bar{\omega}(x, y, 0) - (\gamma - \phi)}{\frac{2\phi}{n-1}}; \text{ and}$$

$$\beta(x, y, 0) = \frac{\bar{\varpi}(x, y, 0) - (\theta - \phi)}{\frac{2\phi}{m-1}};$$

wherein, $$\bar{\omega} = \arctan\left(\frac{x}{y}\right) \text{ and } \bar{\varpi} = \arctan\left(\frac{h}{\sqrt{x^2+y^2}}\right).$$

5. The method of claim 4, wherein the step (a) comprises the steps of:
  (a1) obtaining a first image relating to the surrounding environment of a carrier at a first time point;
  (a2) selecting a datum area from the first image;
  (a3) obtaining a second image relating to the surrounding environment of the carrier at a second time point;
  (a4) performing a search in the second image for locating a comparison area ij the second image that corresponds to the datum area in the first image so as to acquire an image space distance between the comparison area and the datum area; and
  (a5) determining a moving trajectory of the carrier according to the image space distance.

6. The method of claim 4, wherein the search in the second image for locating a comparison area that corresponds to the datum area comprises the steps of:
  calculating a first characteristic value relating to the datum area; and
  comparing every area in the second image with the datum area with regard to the first characteristic value to search and select an area whose sum of absolute differences is the smallest to be the comparison area.

7. The method of claim 6, wherein the first characteristic value is a value of gray level.

8. The method of claim 6, wherein the searching of the area whose sum of absolute difference (SAD) is the smallest to be used as the comparison area comprises the steps of:
  (a11) designating an area in the second image to be a detection area;
  (a12) calculating the sum of absolute differences (SAD) between a second characteristic value of the detection area with the first characteristic value;
  (a13) designating another area in the second image to be a detection area;
  (a14) repeating the step (b) to step (c) so as to obtain a plurality of SADs accordingly; and
  (a15) selecting the minimum from the plural SADs.

9. The method of claim 4, wherein the determining of the moving trajectory of the carrier comprises the steps of:
  determining a moving direction of the carrier according to the image space distance; and
  using the moving direction to search in a pre-established trajectory database for locating a moving trajectory as the moving trajectory of the carrier.

10. The method of claim 4, wherein the estimating of the distance to the identified feature comprises the steps of:
  building in advance a formula for transforming coordinates used for defining locations of features detected in the images into distances in real world; and
  using the coordinates of the identified feature to obtain the distance to the identified feature.

11. The method of claim 4, wherein the step (d) further comprises the steps of:
  estimating a distance to the identified feature if the identified feature is an obstacle; and
  issuing an alert signal if the distance is smaller than a specific distance.

12. The method of claim 4, wherein the step (d) further comprises the steps of:
  estimating a distance to the identified feature if the identified feature is an obstacle; and
  issuing an alert signal if the distance is smaller than a specific distance.

* * * * *